United States Patent [19]
Childers

[11] Patent Number: 6,012,184
[45] Date of Patent: Jan. 11, 2000

[54] CHILD SEAT COVER

[76] Inventor: Katherine E. Childers, 407 S. Monroe, Armington, Ill. 61721

[21] Appl. No.: 09/005,239

[22] Filed: Jan. 9, 1998

[51] Int. Cl.[7] .................................................. A47D 1/00
[52] U.S. Cl. .......................................... 5/416; 5/629; 5/94
[58] Field of Search .................................. 5/629, 638, 94, 5/113, 121, 416, 414, 494; 297/184.13, 184.12; 135/117, 91, 92, 93

[56] References Cited

U.S. PATENT DOCUMENTS

| | | | |
|---|---|---|---|
| 2,644,948 | 7/1953 | Gutmann | 5/416 |
| 3,601,825 | 8/1971 | Moorhead | 5/113 |
| 3,860,980 | 1/1975 | Ebert | 5/121 |
| 4,314,727 | 2/1982 | Potts | 5/113 |
| 4,914,768 | 4/1990 | Howard | 5/113 |
| 4,946,221 | 8/1990 | Livingston | 5/416 |
| 5,074,616 | 12/1991 | Smith | 5/416 |
| 5,184,865 | 2/1993 | Mohtasham et al. | 5/416 |
| 5,449,014 | 9/1995 | Yan-Ho | 5/113 |
| 5,781,946 | 7/1998 | McEntire et al. | 5/416 |

*Primary Examiner*—Michael F. Trettel
*Assistant Examiner*—Fredrick Conley
*Attorney, Agent, or Firm*—Townsend and Townsend and Crew LLP

[57] ABSTRACT

A warming cover configured to cover animate objects, like humans, animals or other living things. The warming cover may be configured to cover transport devices such as child seats, strollers, wheel chairs, or the like, or it may be configured as a blanket, a sleeping bag or a coat. In any event, the warming cover preferably comprises a body of material configured to cover an animate object, an opening in the body of material configured to expose a portion of the animate object to the outside, an opening cover, and elevation means for elevating the opening cover away from the animate object. The warming cover may further comprise a flap attached to the body of material, which preferably is configured to cover at least a portion of the opening when the opening cover is removed.

22 Claims, 3 Drawing Sheets

# 6,012,184

CHILD SEAT COVER

BACKGROUND OF THE INVENTION

The present invention relates generally to an apparatus for keeping people warm, and more particularly to a novel travel blanket, sleeping bag, coat or the like having a removable opening cover for protecting a person's face from the elements.

While transporting a child outside, it is important to ensure that the child is adequately protected from the elements. For example, sun, wind and cold weather exposure can damage a child's delicate skin and can weaken the child's immune systems. Accordingly, it is advantageous to have a suitable blanket or cover to protect the child from the elements.

Child seat covers are well known in the art. For example, U.S. Pat. Nos. 2,628,358, 4,314,727, 4,579,385, 4,583,779 and 4,946,221 all relate generally to various forms of child seat covers. However, the child seat covers of the prior art tend to be bulky and do not adequately protect the child from the elements. For example, the '727 and '385 patents both disclose self-supporting child covers having complicated frame designs, and the '779 patent discloses a sun shade canopy stiffened with rods. In addition, the '221 patent discloses a soft child seat cover, which leaves the child's face exposed to the elements.

SUMMARY OF THE INVENTION

Accordingly, it is an advantage of the present invention to provide a cover for a transport device, such as a child car seat which overcomes the shortcomings of the prior art.

Another advantage of the present invention is that the transport device cover can be configured to cover the entire body of a baby or a child, including the face, without hindering the child's ability to breath.

Another advantage of the present invention is that the transport device cover may be configured to fit a number of different types of transport devices, such as child car seats, strollers, wheel chairs, and other similar devices.

The above and other advantages of the present invention are carried out in one form by a transport device cover configured to cover a device for transporting animate objects, like humans, animals or other living things. The transport device cover preferably comprises a body of material configured to cover the device for transporting; an opening in the body of material configured to expose a portion of the animate object to the outside of the transport device cover through the opening; an opening cover; attachment means for attaching the opening cover to the body of material; and elevation means for elevating the opening cover away from the animate object.

The transport device cover may further comprise a flap attached to the body of material which preferably is configured to cover at least a portion of the opening when the opening cover is removed. In addition, the flap can be rolled-up and secured near an edge of the opening, so that the rolled-up flap acts as a support bridge, holding the opening cover away from the animate object. In this manner, the rolled-up flap is the elevation means.

In accordance with another aspect of the present invention, the transport device cover may be configured to cover child seats, strollers, wheel chairs, or other similar transport devices.

In accordance with another aspect of the present invention, the opening, the opening cover, and the flap of the present invention as set forth above may be configured for use on other warming devices, such as blankets, sleeping bags, coats and the like.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DESCRIPTION OF THE PREFERRED EMBODIMENT

The present invention relates to an apparatus for keeping people warm, and in particular for keeping people's bodies and faces warm. Accordingly, various embodiments of the present invention are disclosed herein. For example, embodiments disclosed herein and illustrated in the figures which comprise the present invention include an infant/child seat cover, blankets, a sleeping bag, and a coat. However, one skilled in the art will appreciate that the present invention is not limited to the illustrated embodiments and that other embodiments of the present invention may exist. For example, other seat covers or travel covers may comprise the present invention, such as covers for wheel chairs, strollers, wagons and the like. Accordingly, the present invention is not limited to the specific embodiments illustrated in the figures or disclosed herein.

Figure 1:
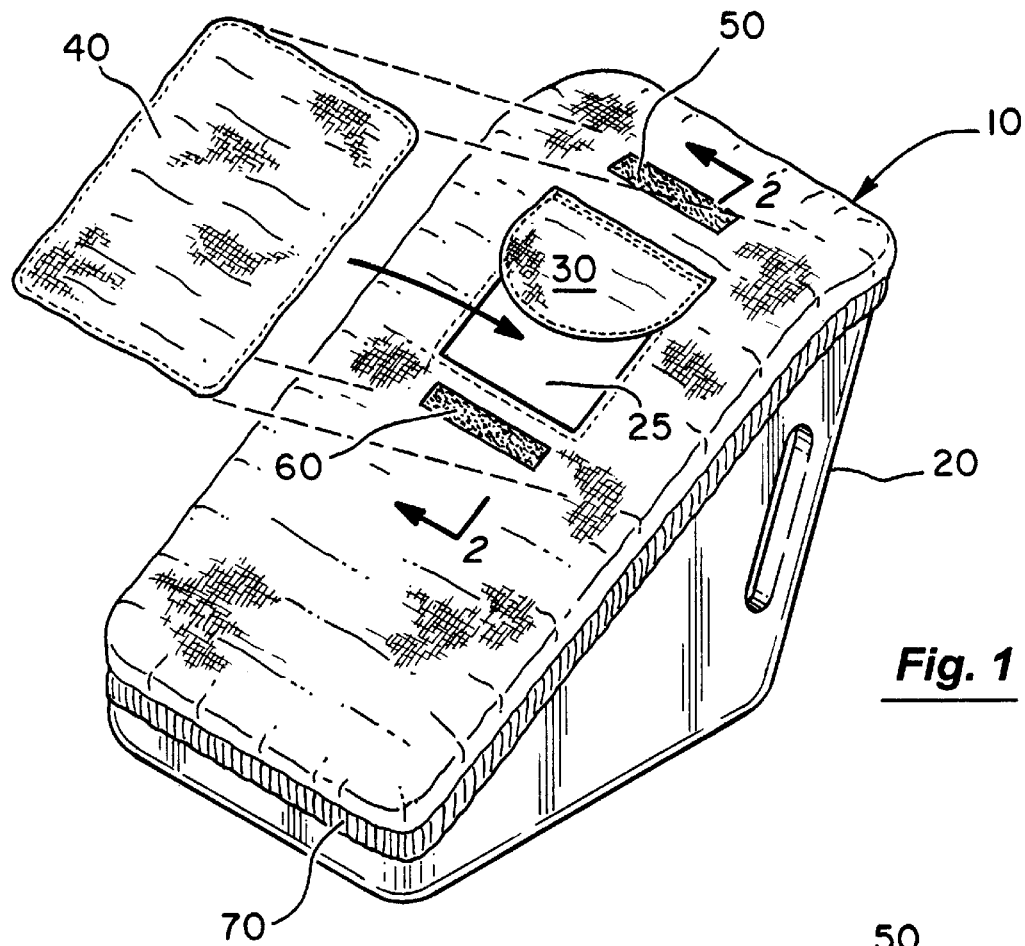
FIG. 1 is a prospective drawing of a child seat cover attached to a child seat.

Referring now to FIG. 1., one embodiment of the present invention is illustrated. A child seat cover 10 is configured to cover a child seat 20.

Cover 10 suitable comprises an opening 25, a flap 30, a opening cover 40, and first and second opening attachment points 50 and 60, respectively. In addition, cover 10 may further comprise a cover attachment mechanism 70 for securely attaching cover 10 to seat 20.

Cover 10 may be made from any suitable material or fabric, such as cotton, wool, fleece, or the like and may include a number of different types and weights of fillers such as fiberfill, thinsulate, down, or the like. In accordance with a preferred embodiment of the present invention, cover 10 preferably is made of a washable quilted fabric and comes in a variety of thickness/weights for use in different weather conditions. For example a thin, light weight cover 10 may be used merely to keep the sun off of the child, while a heavier, thicker cover may be used in cold weather conditions.

Opening 25 is suitable placed in cover 10 at a location which will preferably align with a child's face while the child is sitting or lying in the seat. In accordance with this aspect of the invention, the position of opening 25 in covers 10 may change for covers designed for different seats. That is, opening 25 may be in one location in cover 10 for a cover designed for car seats, and opening 25 may be in a different location in cover 10 for covers designed for wheel chairs or strollers. In any event, opening 25 may be placed in any suitable location in cover 10.

Flap 30 is attached to cover 10 and suitably is configured to cover at least a portion of opening 25. In accordance with this aspect of the invention, flap 30 shields a child's face from the sun, wind and other elements. However, in accordance with a preferred embodiment of the invention, flap 30 does not cover the entire opening 25 of cover 10, so it does not prevent all elements from getting to the child. Accordingly, a suitable opening cover 40 is utilized to completely cover opening 25 when the child needs additional protection.

Opening cover 40 preferably is larger than opening 25 and is attached to cover 10 at first and second attachment points 50, 60. In accordance with different aspects of the present invention, opening cover 40 may be removable from cover 10, or one end of opening cover 40 may be permanently attached to cover 10 at one of attachment points 50 or 60. Opening cover 40 may be attached to cover 10 with any suitable attachment mechanism. For example, velcro, snaps, hooks or other suitable fasteners may be used.

As discussed briefly above, cover 10 may be configured to securely attach to seat 20 using a suitable cover attachment mechanism 70. In accordance with this aspect of the invention, attachment mechanism 70 preferably comprises a piece of elastic sewn into a bottom edge of cover 10. Accordingly, to attache cover 10 onto seat 20, a user preferably stretches the elastic band of attachment mechanism 70 around the frame of the seat. Upon release of the elastic band, the band will contract onto the frame of the seat, holding cover 10 in place.

In addition, in accordance with different embodiments of the present invention, other types of attachment mechanisms 70 may be utilized. For example, cover 10 may attach to seat 20 with velcro, snaps, hooks or other suitable fasteners.

Figure 2:
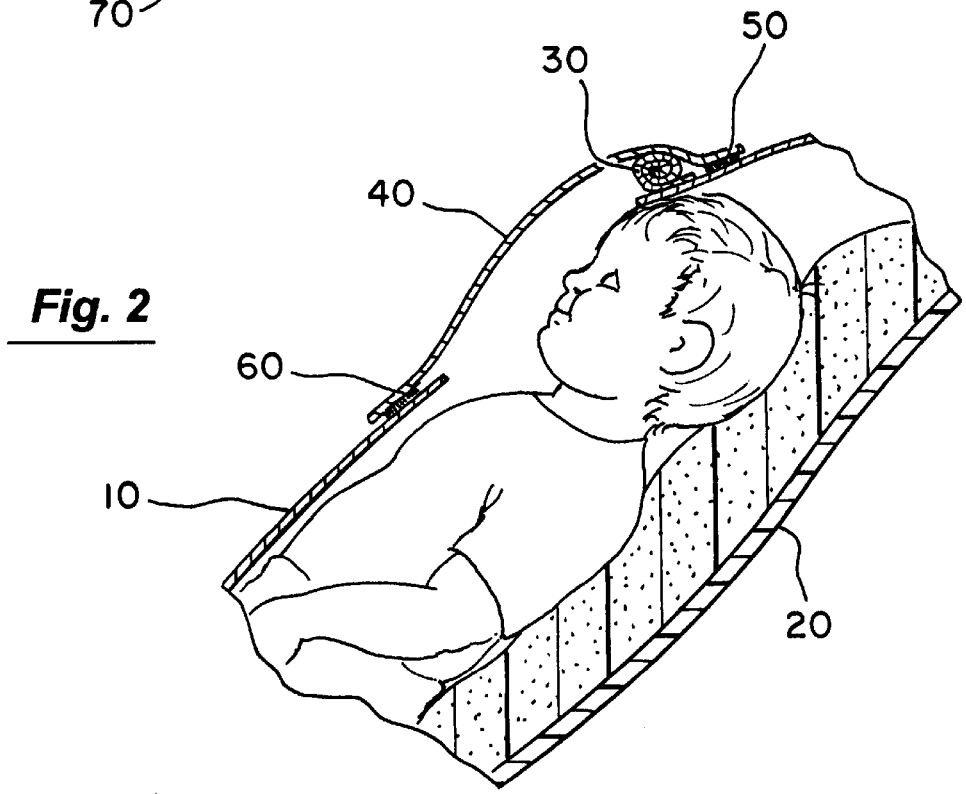
FIG. 2 is a side cross-sectional view of the child seat cover of FIG. 1 showing a suitable opening cover configured over a child's face.

Referring now to FIG. 2, the configuration and operation of opening cover 40 will be discussed. In particular, opening cover 40 preferably is configured so that it remains elevated away from the child's face, thus giving the child a pocket of air and room to breath. In accordance with this aspect of the invention, opening cover 40 preferably is larger than opening 25, and the ends of opening cover 40 are preferably attached to attachment points 50 and 60 near the edges of opening 25. With this particular configuration, because opening cover 40 is larger than opening 25, the edges of opening cover 40 suitably are compressed in towards each other so that they can attach to attachment points 50, 60. This compressing of opening cover 40 causes it to bubble-up away from the child's face. In addition, to help ensure that opening cover 40 stays off the child's face, flap 30 may be rolled-up and secured at one edge of opening 25 using a suitable fastener. In accordance with this aspect of the invention, the rolled-up flap 30 acts as a bridge support, holding opening cover 40 up away from the child's face.

While a preferred embodiment of the invention is disclosed herein using flap 30 to hold opening cover 40 away from the child's face, one skilled in the art will appreciate that other mechanisms may be used. For example, other materials, or other devices may be used.

Figure 3:
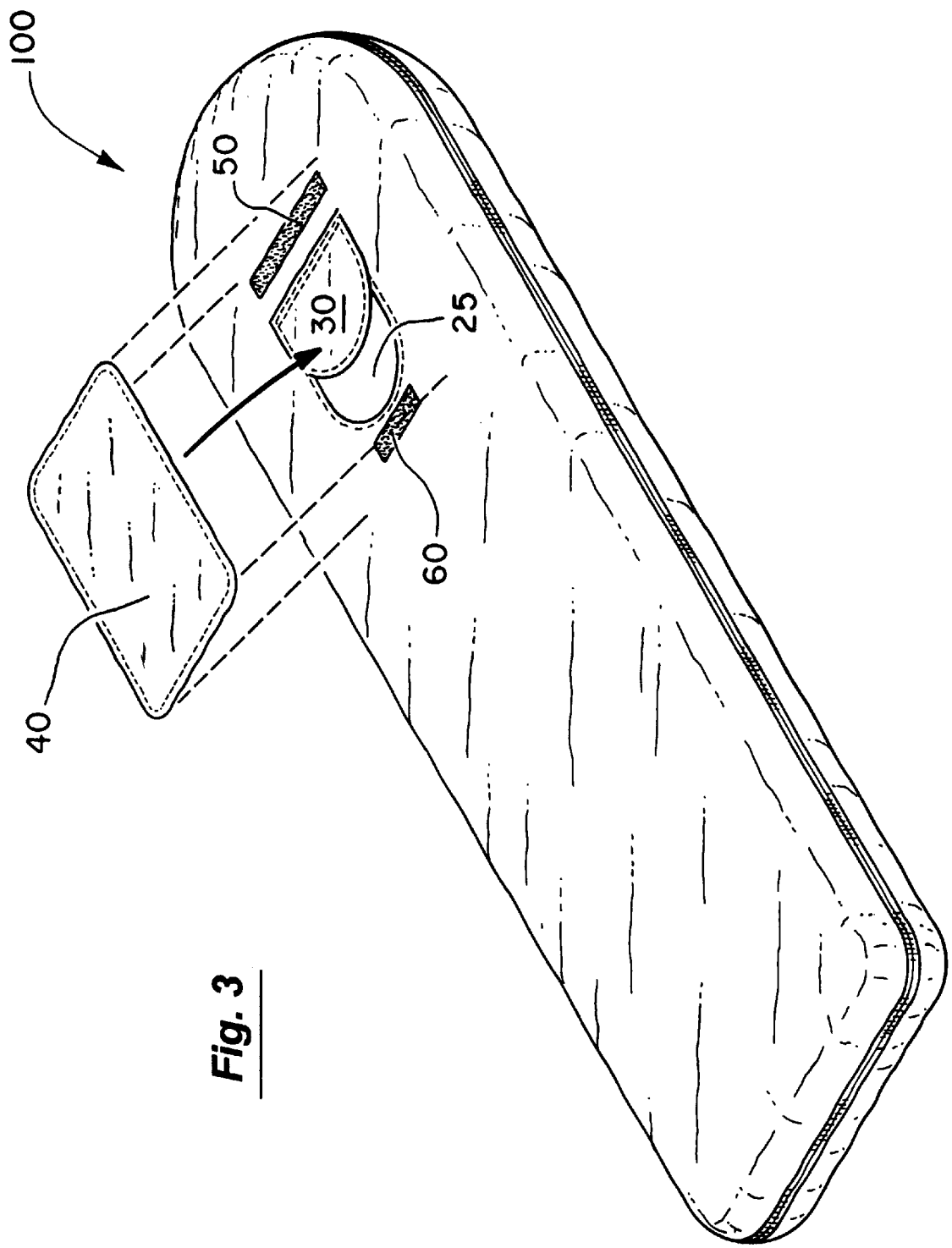
FIG. 3 is a prospective drawing of a sleeping bag, a second embodiment of the invention.

Referring now to FIG. 3, a second embodiment of the present invention is shown. In particular, a sleeping bag 100 is shown having a similar opening 25, opening cover 40 and flap 30 as illustrated in FIGS. 1 and 2 and discussed above. Accordingly, opening 25 is suitably placed in sleeping bag 100 at a location which will preferably align with a person's face. Thus, the position of opening 25 may differ for adult and child sleeping bags, and therefore, as one skilled in the art will appreciate, opening 25 may be placed in any suitable location in sleeping bag 100.

As discussed above, flap 30 preferably is attached to sleeping bag 100 near an edge of opening 25 and suitably is configured to cover at least a portion of opening 25 in sleeping bag 100 when extended. In addition, sleeping bag 100 preferably includes attachment points 50 and 60 for attaching opening cover 40 to sleeping bag 100. As discussed above with reference to child seat cover 10, opening cover 40 preferably is larger than opening 25, so that when cover 40 is attached to attachment points 50, 60, cover 40 will bubble-up away from the person's face. In addition, flap 30 may be rolled up and secured to sleeping bag 100 to also help elevate cover 40 away from the person's face.

Sleeping bag 100 may comprise any suitable sleeping bag currently known in the art or hereinafter developed. Therefore, the present invention is not limited to any particular sleeping bag design.

Figure 4:
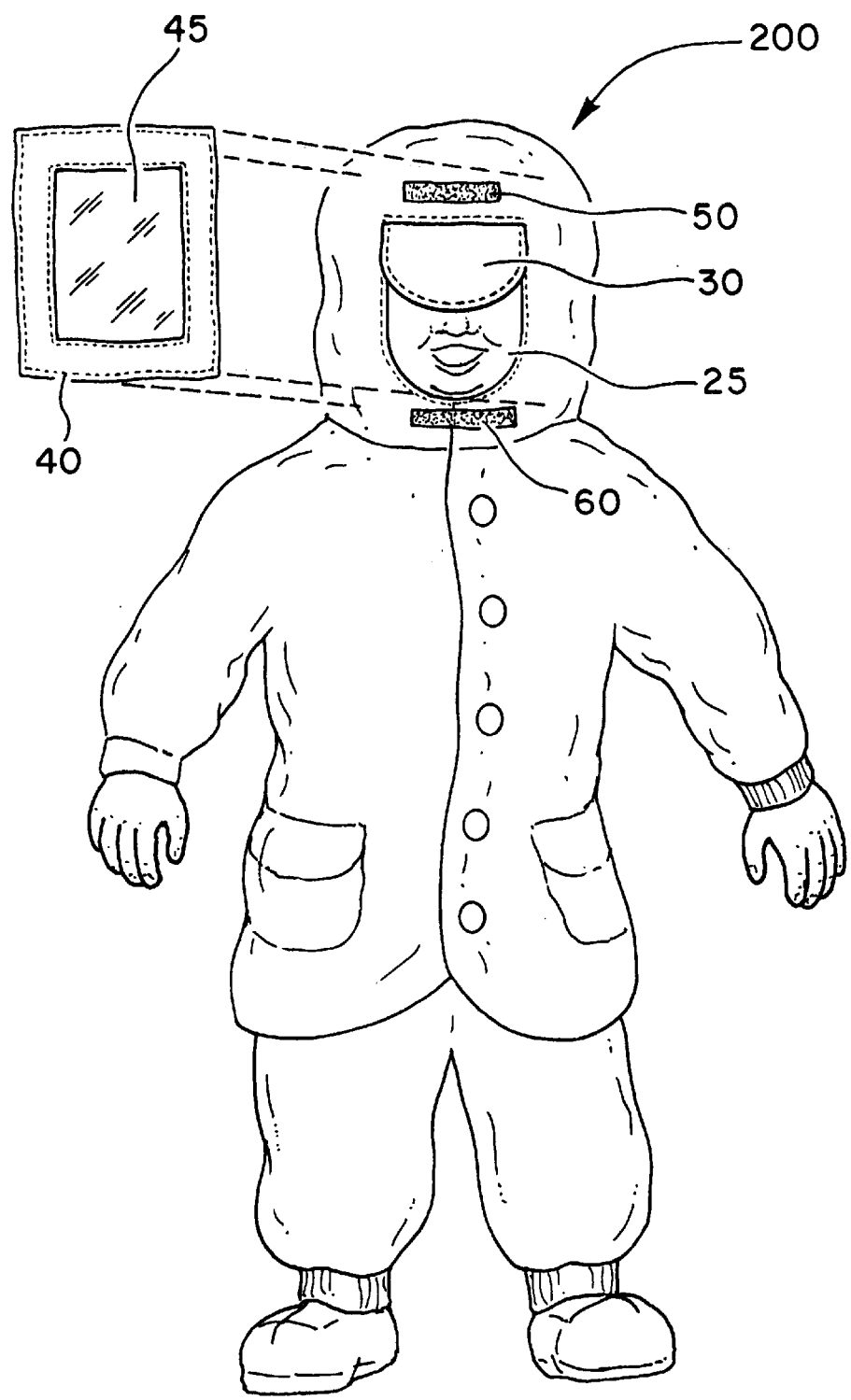
FIG. 4 is a front view of a person wearing a coat which is a third embodiment of the present invention.

Referring now to FIG. 4, a third embodiment of the present invention is illustrated. In particular, a coat 200 is shown having the similar opening and opening cover configuration as illustrated and described with respect to car seat cover 10 and sleeping bag 100. The configuration and operation of opening 25, flap 30, opening cover 40, and attachment points 50 and 60 is the same as that discussed above with reference to car seat cover 10 and sleeping bag 100. Therefore, the details of that configuration and operation will not be repeated.

However, as one skilled in the art will appreciate, if opening cover 40 is opaque, it will be difficult for the person wearing the coat 200 to see out. Thus, in accordance with one aspect of this embodiment of the invention, opening cover 40 may further comprise a transparent window 45 so that the person wearing the coat can see out. In accordance with this aspect of the invention, transparent window 45 preferably comprises a clear flexible plastic material which may be configured to bubble-out away from the face of the coat wearer as discussed above.

In conclusion, the present invention provides a novel warming mechanism for use with a variety of different devices, such as travel covers, blankets, sleeping bags, coats, or the like. While a detailed description of presently preferred embodiments of the invention have been given above, various alternatives, modifications, and equivalents will be apparent to those skilled in the art. For example, while a preferred embodiment disclosed herein is primarily directed to a child seat cover, one skilled in the art will appreciate that similar covers for other devices may utilize the same inventive concepts. For example, covers for other devices such as strollers, wheel chairs, or the like may incorporate the present invention without varying from the spirit of the invention. In addition, while the present invention is described herein with reference to people, one skilled in the art will appreciate that it can be used to cover other animals, or other living things. Therefore, the above description should not be taken as limiting the scope of the invention which is defined by the appended claims.

What is claimed is:

1. A child seat cover, comprising:

a body of material for covering a child seat;

an opening in said body of material configured so that a child's face is exposed to an outside of said child seat cover through said opening;

an opening cover;

attachment means for attaching said opening cover to said body of material above said opening; and elevation means attached to said body of material proximate said opening for elevating said opening cover away from said child's face while said opening cover is covering said opening.

2. The child seat cover as recited in claim 1, further comprising a second attachment means for attaching said child s eat cover to a child seat.

3. The child seat cover as recited in claim 1 wherein said opening cover is removable.

4. The child seat cover as recited in claim 3, further comprising a flap attached to said body of material and configured to cover at least a portion of said opening when said opening cover is removed.

5. The child seat cover as recited in claim 4, wherein when said opening cover is attached to said body of material, said elevation means comprises said flap rolled-up and secured to said body of material proximate said opening.

6. The child seat cover as recited in claim 3 wherein said opening cover is larger than said opening, and wherein said attachment means comprises a first fastening means, positioned proximate a first edge of said opening, for fastening a first end of said opening cover to said body of material, and a second fastening means, positioned proximate a second edge of said opening, for fastening a second end of said opening cover to said body of material, and wherein said elevation means comprises said opening cover configured so that when said first and said second ends of said opening cover are fastened to said body of material, said opening cover will bubble-up over said opening, elevating said opening cover away from said child's face.

7. The child seat cover as recited in claim 6 wherein said first and said second fastening means comprise velcro.

8. The child seat cover as recited in claim 6 wherein said first and said second fastening means comprise snaps.

9. A child seat cover, comprising:

a body of material for covering a child seat;

first attachment means for securely attaching said child seat cover to a child seat;

an opening in said body of material configured so that a child's face is exposed to an outside of said child seat cover through said opening;

a removable opening cover;

a flap attached to said body of material and configured to cover at least a portion of said opening; and second attachment means for attaching said removable opening cover to said body of material above said opening;

said flap being configured to elevate said opening cover away from said child's face while said opening cover is covering said opening.

10. The child seat cover as recited in claim 9 wherein said opening cover is larger than said opening, and wherein said second attachment means comprises a first fastening means, positioned proximate a first edge of said opening, for fastening a first end of said opening cover to said body of material, and a second fastening means, positioned proximate a second edge of said opening, for fastening a second end of said opening cover to said body of material, and wherein said opening cover is configured so that when said first and said second ends of said opening cover are fastened to said body of material, said opening cover will bubble-up over said opening, elevating said opening cover away from said child's face.

11. The body of material as recited in claim 10 wherein said first and said second fastening means comprise velcro.

12. The body of material as recited in claim 10 wherein said first and said second fastening g means comprise snaps.

13. A warming cover, comprising:

a body of material for covering an animate object;

an opening in said body of material configured so expose a portion of an animate object to an outside of said warming cover through said opening;

an opening cover;

attachment means for attaching said opening cover to said body of material above said opening; and elevation means attached to said body of material proximate said opening for elevating said opening cover away from said animate object while said opening cover is covering said opening.

14. The warming cover as recited in claim 13 wherein said warming cover is configured to cover an infant in a car seat.

15. The warming cover as recited in claim 13 wherein said warming cover is configured to cover a person in a wheel chair.

16. The warming cover as recited in claim 13 wherein said warming cover is a sleeping bag.

17. The warming cover as recited in claim 13 wherein said warming cover is a coat.

18. The warming cover as recited in claim 13 wherein said warming cover is a blanket.

19. The warming cover as recited in claim 13 wherein said opening cover is removable.

20. The warming cover as recited in claim 19 further comprising a flap attached to said body of material and configured to cover at least a portion of said opening when said opening cover is removed.

21. The warming cover as recited in claim 20, wherein when said opening cover is attached to said body of material, said elevation means comprises said flap rolled-up and secured to said body of material proximate said opening.

22. The warming cover as recited in claim 19 wherein said opening cover is larger than said opening, and wherein said attachment means comprises a first fastening means, positioned proximate a first edge of said opening, for fastening a first end of said opening cover to said body of material, and a second fastening means, positioned proximate a second edge of said opening, for fastening a second end of said opening cover to said body of material, and wherein said elevation means comprises said opening cover configured so that when said first and said second ends of said opening cover are fastened to said body of material, said opening cover will bubble-up over said opening, elevating said opening cover away from said animate object.

\* \* \* \* \*